(12) United States Patent
Feng et al.

(10) Patent No.: US 11,651,273 B2
(45) Date of Patent: May 16, 2023

(54) MACHINE LEARNING USING PARTIAL ORDER HYPERGRAPHS

(71) Applicant: National University of Singapore, Singapore (SG)

(72) Inventors: Fuli Feng, Singapore (SG); Xiangnan He, Singapore (SG); Tat-Seng Chua, Singapore (SG)

(73) Assignee: National University of Singapore, Singapore (SG)

( * ) Notice: Subject to any disclaimer, the term of this patent is extended or adjusted under 35 U.S.C. 154(b) by 1063 days.

(21) Appl. No.: 16/388,710

(22) Filed: Apr. 18, 2019

(65) Prior Publication Data

US 2019/0325343 A1  Oct. 24, 2019

(30) Foreign Application Priority Data

Apr. 19, 2018 (SG) .......................... 10201803292R

(51) Int. Cl.
G06F 17/16 (2006.01)
G06F 16/901 (2019.01)
G06N 20/00 (2019.01)

(52) U.S. Cl.
CPC ......... *G06N 20/00* (2019.01); *G06F 16/9024* (2019.01); *G06F 17/16* (2013.01)

(58) Field of Classification Search
CPC ...... G06N 20/00; G06F 16/9024; G06F 17/16
USPC ................................................... 726/12
See application file for complete search history.

(56) References Cited

U.S. PATENT DOCUMENTS

| 11,334,935 | B2 * | 5/2022 | Chen | ................... | G06F 16/9024 |
| 2009/0210828 | A1 * | 8/2009 | Kahn | .................... | G06F 40/134 |
| | | | | | 715/205 |
| 2012/0137367 | A1 * | 5/2012 | Dupont | ................... | G06F 21/00 |
| | | | | | 726/25 |

OTHER PUBLICATIONS

F, Feng; Learning on Partial-Order Hypergraphs; ACM:2018; pp. 1523-1531.*

* cited by examiner

*Primary Examiner* — Monjur Rahim

(57) ABSTRACT

A machine learning method comprises: receiving input data comprising a set of feature variables each indicating features of a plurality of entities; encoding partial order relations between entities of the plurality of entities as a set of logic rules; constructing a hypergraph comprising a plurality of vertices representing the entities of the plurality of entities and a plurality of hyperlinks linking similar entities of the plurality of entities; adding directed edges to the hypergraph to represent partial order interactions between entities to form a partial order hypergraph; representing the partial order hypergraph as a set of matrices; forming an objective function using the logic rules and matrices of the set of matrices; minimizing the objective function to obtain a prediction function; and outputting an indication of the prediction function.

18 Claims, 7 Drawing Sheets

| Uni | City | Sal |
|---|---|---|
| $u_1$ | $c_1$ | $s_2$ |
| $u_2$ | $c_1$ | $s_2$ |
| $u_3$ | $c_1$ | $s_1$ |
| $u_4$ | $c_1$ | $s_4$ |
| $u_5$ | $c_2$ | $s_1$ |
| $u_6$ | $c_2$ | $s_3$ |
| $u_7$ | $c_3$ | $s_1$ |
FIG.1A
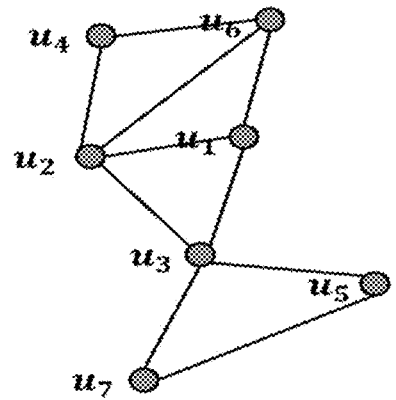
FIG.1B
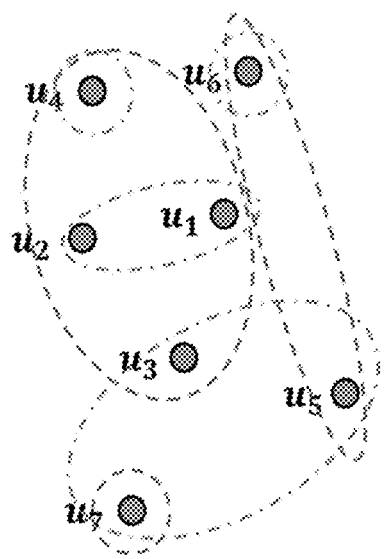
FIG.1C
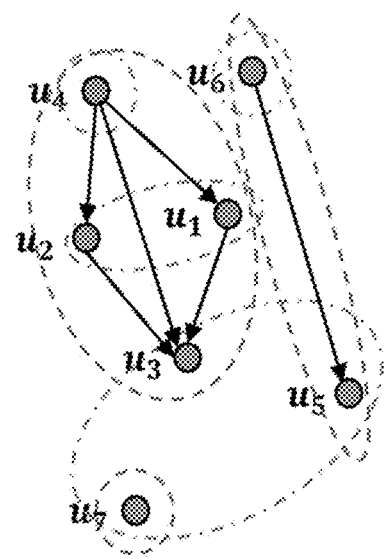
FIG.1D

MACHINE LEARNING USING PARTIAL ORDER HYPERGRAPHS

CROSS-REFERENCE TO RELATED APPLICATIONS

The present application claims priority to Singapore Application No. SG 10201803292R filed with the Intellectual Property Office of Singapore on Apr. 19, 2018, which is incorporated herein by reference in its entirety for all purposes.

TECHNICAL FIELD

The present disclosure relates to machine learning and in particular to the use of hypergraphs in machine learning.

BACKGROUND

Graph-based learning methods explicitly consider the relations between two entities (i.e., vertices) for learning a prediction function. They have been widely used in semi-supervised learning, manifold ranking, and clustering, among other tasks. Graphs naturally represent relational data and have been widely used to model the relationships between entities. Simple graphs intuitively connect two vertices (i.e., entities of interest) with an edge (i.e., the relationship to model), which can be either undirected or directed depending on whether the pairwise relationship between entities is symmetric. For example, given a set of entities with feature vectors, we can construct an undirected graph by forming the adjacency matrix with a similarity metric. The World Wide Web is a well-known instance of directed graphs, where vertices represent webpages, and edges represent hyperlinks. With such graph representations of entities and their relations, many graph-based learning methods have been developed to address various tasks, such as semi-supervised learning, manifold ranking, clustering, personalized recommendation and so on.

Enhancing the expressiveness of simple graphs, hypergraphs formulate an edge as a link to multiple vertices, so as to model the higher-order relations among entities. For example, hyperedges in a hypergraph can be used to encode the similarity among vertices. In existing research, hyperedges in a hypergraph are typically formed by linking similar entities—either globally similar such as a cluster of entities that are close to each other, or locally similar such as sharing a same attribute. However, many real-world applications need to deal with far more complex relations than similarities. One particular type is the ordering relationship among entities, which commonly exists in graded categorical features and numerical features.

All existing hypergraph structures represent the hyperedge as an unordered set of vertices, without considering the possible ordering relationship among vertices. In real-world data, ordering relations commonly exist, such as in graded categorical features (e.g., users' ratings on movies) and numerical features (e.g., monthly income of customers). When constructing a hypergraph, ignoring such ordering relations among entities will lead to severe information loss, resulting in suboptimal performance of the subsequent learning algorithms.

SUMMARY

According to a first aspect of the present disclosure a machine learning method is provided. The machine learning method comprises: receiving input data comprising a set of feature variables each indicating features of a plurality of entities; encoding partial order relations between entities of the plurality of entities as a set of logic rules; constructing a hypergraph comprising a plurality of vertices representing the entities of the plurality of entities and a plurality of hyperlinks linking similar entities of the plurality of entities; adding directed edges to the hypergraph to represent partial order interactions between entities to form a partial order hypergraph; representing the partial order hypergraph as a set of matrices; forming an objective function using the logic rules and matrices of the set of matrices; minimizing the objective function to obtain a prediction function; and outputting an indication of the prediction function.

In an embodiment, the set of matrices comprises a partial incidence matrix representing the directed edges.

In an embodiment, the partial incidence matrix is derived from a product of a binary relation matrix indicating pairs of entities having partial order relations and a co-occurrence matrix indicating a number of hyperedges connecting pairs of entities.

In an embodiment, directed edges are only added between pairs of vertices connected by at least one hyperedge.

In an embodiment, representing the partial order hypergraph as a set of matrices comprises assigning weights to pairs of vertices, the weights being dependent on the number of hyperedges connecting a pair of vertices.

In an embodiment, the objective function comprises a regularization term that encodes the logic rules.

In an embodiment, forming the objective function comprises replacing a binary logic function derived from the set of logic rules with a continuous function.

In an embodiment, minimizing the objective function comprises applying a gradient based method to the objective function.

In an embodiment the method is a method of ranking the entities.

In an embodiment, the method is a method of predicting a variable, for example a popularity of the entities.

According to a second aspect of the second disclosure, a data processing system is provided. The data processing system comprises a processor and a data storage device. The data storage device stores computer executable instructions operable by the processor to: receive input data comprising a set of feature variables each indicating features of a plurality of entities; encode partial order relations between entities of the plurality of entities as a set of logic rules; construct a hypergraph comprising a plurality of vertices representing the entities of the plurality of entities and a plurality of hyperlinks linking similar entities of the plurality of entities; add directed edges to the hypergraph to represent partial order interactions between entities to form a partial order hypergraph; represent the partial order hypergraph as a set of matrices; form an objective function using the logic rules and matrices of the set of matrices; minimize the objective function to obtain a prediction function; and output an indication of the prediction function.

According to a yet further aspect, there is provided a non-transitory computer-readable medium. The computer-readable medium has stored thereon program instructions for causing at least one processor to perform operations of a method disclosed above.

BRIEF DESCRIPTION OF THE DRAWINGS

In the following, embodiments of the present invention will be described as non-limiting examples with reference to the accompanying drawings in which:

FIG. 1A to FIG. 1D show an illustrative example of using graph methods to tackle a university ranking test;

DETAILED DESCRIPTION

Figure 2:
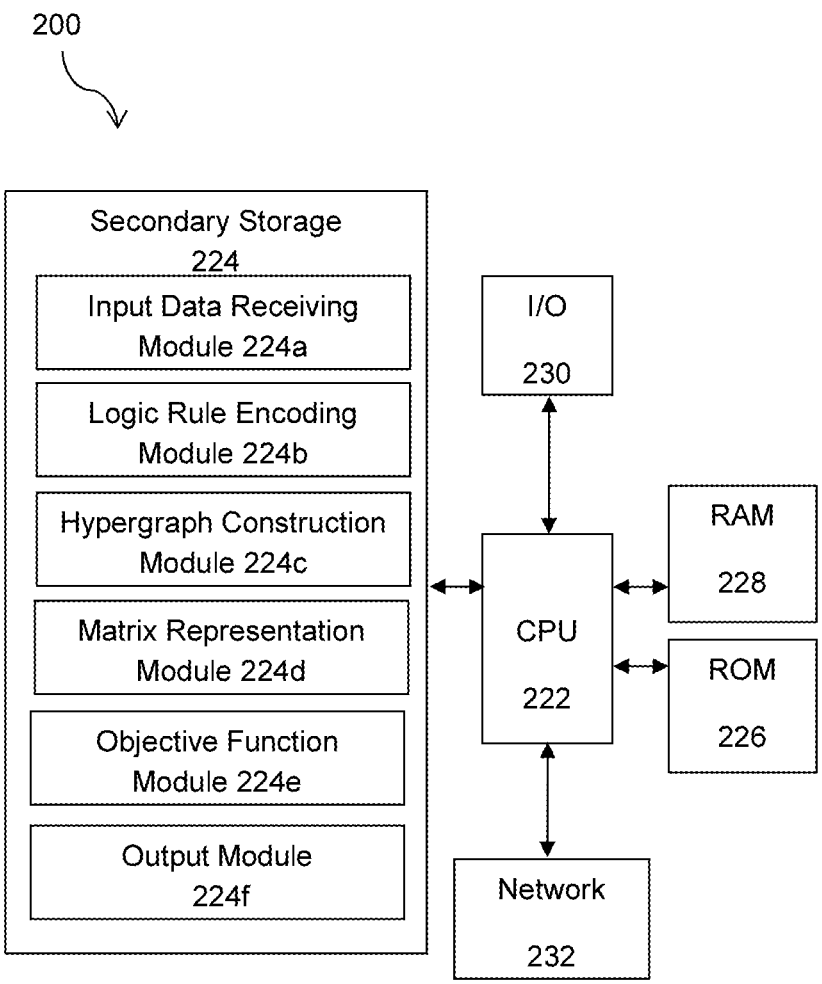
FIG. 2 is a block diagram showing a technical architecture of a data processing system according to an embodiment of the present invention.

In the present disclosure, we address the inherent limitation of existing hypergraphs by proposing a new data structure named Partial-Order Hypergraph (POH), which specifically injects the partially ordering relations among vertices into a hyperedge. We develop regularization-based learning theories for partial-order hypergraphs, generalizing conventional hypergraph learning by incorporating logical rules that encode the partial-order relations. We apply our proposed method to two applications: university ranking from Web data and popularity prediction of online content. Extensive experiments demonstrate the superiority of our proposed partial-order hypergraphs. For instance, the POH outperforms conventional hypergraph methods with an average improvement of 128% on the popularity prediction task.

In the present disclosure, the following notation is used. We use bold capital letters (e.g., X) and bold lowercase letters (e.g., x) to denote matrices and vectors, respectively. Scalars and hyperparameters are respectively represented as normal lowercase letters (e.g., x) and Greek letters (e.g., $\lambda$). If not otherwise specified, all vectors are in a column form, and $X_{ij}$ denotes the entry at the i-th row and the j-th column of X.

FIGS. 1A to 1D show an illustrative example of using graph methods to tackle a university ranking test. FIG. 1A shows the input data, each university $u_i$ has two features: the located city $c_i$ and the salary level $s_i$ of its graduates. Each row represents a university and its features: city and salary level; for salary level, smaller index indicates higher salary (i.e., $s_1 > s_2 > s_3 > s_4$).

FIG. 1B shows a simple graph where an edge connects a vertex and its two-nearest vertices. The graph shown in FIG. 1B is constructed by connecting a university with its two nearest neighbors. Then, by performing a manifold ranking on the simple graph a ranked list of universities may be obtained.

FIG. 1C shows a hypergraph in which a hyperedge connects vertices with a same attribute: either in the same city or having the same salary level. The hypergraph is built by connecting universities with a same attribute e.g., universities that are located in the same city, which is a high-order relation among universities missed by the simple graph.

Taking the university ranking task described above as an example. Two universities $u_5$ and $u_6$ are located in the same city, while $u_5$ has a salary level much higher than $u_6$—evidence that $u_5$ might be ranked higher than $u_6$. Unfortunately, the hypergraph constructed in FIG. 1C encodes the similarity information only, thus fails to capture the ordering information on salary. To address this limitation, an intuitive solution is to incorporate the ordering relations by adding directed edges between entities of a hyperedge.

FIG. 1D shows a partial-order hypergraph, where the directed edges within an hyperedge represent the partially ordering relationship between vertices on the salary level. It is worth noting that not every two entities within a hyperedge have an ordering relation; for example, two entities may have the same graded categorical feature (see $u_1$ and $u_2$ in FIG. 1D) or the difference on the target numerical feature is not significant enough. We term this generalized hypergraph with partial-order relations on vertices as a Partial-Order Hypergraph (POH), which is a new data structure that has never been explored before.

In this disclosure, we formalize the concept of POHs and further develop regularization-based graph learning theories on them. We express the partial-order relations with logical rules, which can be used to encode prior domain knowledge. In the previous example of university ranking, one example of domain knowledge can be that for two universities $u_i$ and $u_j$ in the same city, $u_i$ tends to be ranked higher than $u_j$ if the salary level of $u_i$ is higher than that of $u_j$. The corresponding logical rule can be written as:

$$\text{city}_=(u_i,u_j) \wedge \text{salary}_>(u_i,u_j) \rightarrow \text{score}_>(u_i,u_j).$$

We extend conventional hypergraph learning to incorporate such logical rules for an effective learning on POHs. Besides the improved accuracy, we can further enhance the interpretability of hypergraph learning. Specifically, we can interpret the learning results by verifying the logical rules, rather than relying on the smoothness factor only. To justify our proposed partial-order hypergraph and the learning method, we employ them to address two applications: university ranking and popularity prediction; the two tasks are representatives of two machine learning tasks: unsupervised ranking and semi-supervised regression, respectively. Extensive results demonstrate the superiority of our proposed method, which significantly outperforms existing simple graph and hypergraph methods.

Hypergraphs

The vertices and hyperedges of a hypergraph represent the entities of interest and their relations, respectively. Given N entities with their features $X=[x_1, x_2, \ldots, x_N]^T \in \mathbb{R}^{N \times D}$, we can construct a hypergraph with N vertices and M hyperedges, for which the structure can be represented as an incidence matrix $H \in \mathbb{R}^{N \times M}$. Similar to the incidence matrix of a simple graph, H is a binary matrix, where $H_{ij}=1$ if the i-th vertex is connected by the j-th hyperedge, otherwise $H_{ij}=0$. There are two ways to define a hyperedge: attribute-based and neighbor-based. An attribute-based hyperedge connects vertices with same value on one or multiple target attributes (i.e., features). A neighbor-based hyperedge connects vertices nearby, based on these vertices with similarity larger than a threshold or simply using the k-nearest neighbors. A neighborhood-based hyperedge connects vertices near a given vertex, within either a similarity threshold or an order threshold (k-nearest).

Moreover, we use the diagonal matrix $E \in R^{M \times M}$ to denote the degrees of hyperedges, i.e., $E_{jj} = \Sigma_{i=1}^{N} H_{ij}$ denotes the number of vertices connected by the j-th hyperedge. Analogous to simple graph that an edge typically has a weight to model the strength of the relation, a hyperedge in hypergraphs also has a weight to denote the density of the vertices it connected. The weights are represented as a diagonal matrix $W \in R^{M \times M}$. To estimate the hyperedge weight, many methods have been proposed, among which the most popular one is to use the average pairwise similarity between vertices connected by the hyperedge:

$$W_{jj} = \frac{1}{E_{jj}} \sum_{H_{ij}=1} g(x_i, x_j), \quad (1)$$

where g denotes the similarity function on feature vectors. In graph-based methods, one common choice for g is the radial basis function (RBF) kernel, i.e., $$g(x_i, x_j) = \exp\left(\frac{-|x_i - x_j|^2}{2\sigma^2}\right).$$

Given the weights for hyperedges, we can further derive the degree of a vertex i: $V_{ii} = \Sigma_{j=1}^{M} W_{jj} H_{ij}$, i.e., the sum of weights of hyperedges that are connected with i. We use the diagonal matrix $V \in R^{N \times N}$ to denote the vertex degree matrix.

Learning on Hypergraphs

Graph-based learning has been applied to various machine learning tasks such as manifold ranking, semi-supervised learning, and clustering. The general problem setting is to learn a prediction function $\hat{y}=f(x)$, which maps an entity from the feature space to the target label space. It is usually achieved by minimizing an objective function abstracted as:

$$\Gamma = \mathcal{G} + \lambda \mathcal{L} \quad (2)$$

where $\mathcal{L}$ is a task-specific loss function that measures the error between prediction $\hat{y}$ and ground-truth y, $\mathcal{G}$ is a graph regularization term that smooths the prediction over the graph, and $\lambda$ is a hyperparameter to balance the two terms. The regularization term typically implements the smoothness assumption that similar vertices tend to have similar predictions. For hypergraphs, a widely used $\mathcal{G}$ is the hypergraph Laplacian term, defined as:

$$\mathcal{G} = \sum_{i=1}^{N} \sum_{j=1}^{N} \underbrace{g(x_i, x_j) \sum 1_{k=1}^{m} H_{ik} W_{kk} H_{jk}}_{\text{strength of smoothness}} \underbrace{\left|\frac{f(x_i)}{\sqrt{V_{ii}}} - \frac{f(x_j)}{\sqrt{V_{jj}}}\right|^2}_{\text{smoothness}}. \quad (3)$$

The regularization term operates smoothness on each pair of entities, enforcing their predictions (after normalized by their degrees) to be close to each other. The strength of smoothness is determined by the similarity over their feature vectors $g(x_i, x_j)$ and the hyperedges that connect the two vertices. It can be equivalently written in a more concise matrix form:

$$\mathcal{G} = \text{trace}(\hat{Y}(S \odot L)\hat{Y}^T), \quad (4)$$

where $\hat{Y} = [\hat{y}_1, \hat{y}_2, \ldots, \hat{y}_N]$, each element of S is $S_{ij} = g(x_i, x_j)$, and L is defined as $L = V^{-1/2}(V - HWH^T)V^{-1/2}$, known as the hypergraph Laplacian matrix. Note that L is typically a sparse matrix, where an entry $L_{ij}$ is nonzero only if vertex i and j are connected by at least one hyperedge. Thus, the time complexity of calculating $\mathcal{G}$ is linear with respect to the number of nonzero entries in L, which is far smaller than $N^2$.

Partial Order Hypergraph Learning

Distinct from the typical problem setting of hypergraph learning, we further associate the problem with a set of logic rules, which can be used to encode the partial-order relations between entities:

$$\{p^r(x_i, x_j) \rightarrow q^r(f(x_i), f(x_j)) | r = 1, 2, \ldots, R\}, \quad (6)$$

where r denotes a partial-order relation, and there can be multiple relations (in total R) for a problem. For example, in the university ranking task, we can have a partial-order relation based on salary level, number of students, research grants among other features. For each partial-order relation r, $q^r$ is a binary function indicating whether the prediction of two entities satisfies a certain relation. For example, in a ranking/regression task, $q^r$ can indicate whether $f(x_i)$ is higher than $f(x_j)$; in a classification task, $q^r$ can indicate whether the probability of $x_i$ being a class is higher than that of $x_j$. The $p^r(x_i, x_j)$ denotes whether $x_i$ and $x_j$ have the partial-order relation r. A partial-order relation is a pairwise relation satisfying the following basic properties on the entities connected by any hyperedge:

Irreflexivity: not $p^r(x_i, x_i)$.
Asymmetry: if $p^r(x_i, x_j)$ then not $p^r(x_j, x_i)$.
Transitivity: $p^r(x_i, x_j)$ and $p^r(x_j, x_k)$ implies $p^r(x_i, x_k)$.

In the following, systems and methods which implement machine learning using POHs are described. We first present how to construct and represent a POH. We then elaborate our proposed regularized learning on POHs. Lastly, we analyze its time complexity.

FIG. 2 is a block diagram showing a technical architecture 200 of a data processing system according to an embodiment of the present invention. Typically, the methods of machine learning using partial order hypergraphs according to embodiments of the present invention are implemented on a computer or a number of computers each having a data-processing unit. The block diagram as shown in FIG. 2 illustrates a technical architecture 200 of a computer which is suitable for implementing one or more embodiments herein.

The technical architecture 200 includes a processor 222 (which may be referred to as a central processor unit or CPU) that is in communication with memory devices including secondary storage 224 (such as disk drives), read only memory (ROM) 226, random access memory (RAM) 228. The processor 222 may be implemented as one or more CPU chips. The technical architecture 220 may further comprise input/output (I/O) devices 230, and network connectivity devices 232. The technical architecture 200 further comprises activity table storage which may be implemented as a hard disk drive or other type of storage device.

The secondary storage 224 is typically comprised of one or more disk drives or tape drives and is used for non-volatile storage of data and as an over-flow data storage device if RAM 228 is not large enough to hold all working data. Secondary storage 224 may be used to store programs which are loaded into RAM 228 when such programs are selected for execution. In this embodiment, the secondary storage 224 has an input data receiving module 224a, a logic rule encoding module 224b, a hypergraph construction module 224c, a matrix representation module 224d, an objective function module 224e and an output module 224f comprising non-transitory instructions operative by the processor 222 to perform various operations of the methods of the present disclosure. As depicted in FIG. 2, the modules 224a-224f are distinct modules which perform respective functions implemented by the data processing system. It will be appreciated that the boundaries between these modules are exemplary only, and that alternative embodiments may merge modules or impose an alternative decomposition of functionality of modules. For example, the modules discussed herein may be decomposed into sub-modules to be executed as multiple computer processes, and, optionally, on multiple computers. Moreover, alternative embodiments may combine multiple instances of a particular module or sub-module. It will also be appreciated that, while a software implementation of the modules 224a-224f is described herein, these may alternatively be implemented as one or more hardware modules (such as field-programmable gate array(s) or application-specific integrated circuit(s)) comprising circuitry which implements equivalent functionality to that implemented in software. The ROM 226 is used to store instructions and perhaps data which are read during program execution. The secondary storage 224, the RAM 228, and/or the ROM 226 may be referred to in some contexts as computer readable storage media and/or non-transitory computer readable media.

The I/O devices 230 may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 232 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 232 may enable the processor 222 to communicate with the Internet or one or more intranets. With such a network connection, it is contemplated that the processor 222 might receive information from the network, or might output information to the network in the course of performing the method operations described herein. Such information, which is often represented as a sequence of instructions to be executed using processor 222, may be received from and outputted to the network, for example, in the form of a computer data signal embodied in a carrier wave.

The processor 222 executes instructions, codes, computer programs, scripts which it accesses from hard disk, floppy disk, optical disk (these various disk based systems may all be considered secondary storage 224), flash drive, ROM 226, RAM 228, or the network connectivity devices 232. While only one processor 222 is shown, multiple processors may be present. Thus, while instructions may be discussed as executed by a processor, the instructions may be executed simultaneously, serially, or otherwise executed by one or multiple processors.

It is understood that by programming and/or loading executable instructions onto the technical architecture 200, at least one of the CPU 222, the RAM 228, and the ROM 226 are changed, transforming the technical architecture 200 in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules. Although the technical architecture 200 is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture 200 to provide the functionality of a number of servers that is not directly bound to the number of computers in the technical architecture 200. In an embodiment, the functionality disclosed above may be provided by executing the application and/or applications in a cloud computing environment. Cloud computing may comprise providing computing services via a network connection using dynamically scalable computing resources. A cloud computing environment may be established by an enterprise and/or may be hired on an as-needed basis from a third party provider.

Figure 3:
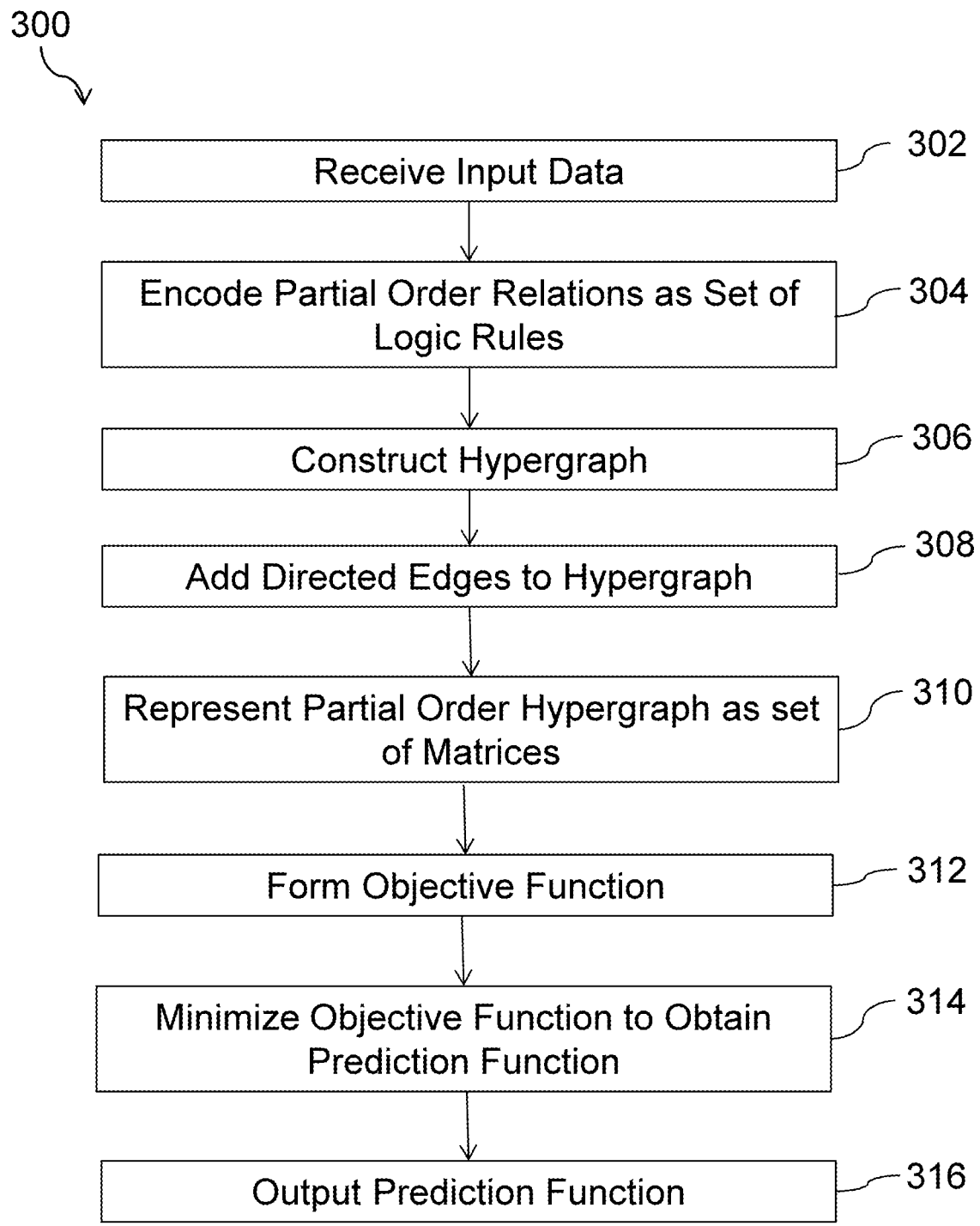
FIG. 3 is a flowchart showing a method of machine learning using a partial order hypergraph according to an embodiment of the present invention.

FIG. 3 is a flowchart showing a method of machine learning using a partial order hypergraph according to an embodiment of the present invention. The method 300 is carried out on the data processing system 200 shown in FIG. 2.

In step 302, the input data receiving module 224a of the data processing system 200 receives input data. The input data comprises a set of feature variables each indicating features of a plurality of entities. The input may comprise a feature matrix indicative of the features of the plurality of entities.

In step 304, the logic rule encoding module 224b of the data processing system 200 encodes partial order relations between the entities as a set of logic rules. As describes above, the logic rules may be expressed according to equation (6).

In step 306, the hypergraph construction module 224c of the data processing system 200 constructs a hypergraph with each node of the hypergraph representing the entities of the plurality of entities and hyperlinks between the entities linking similar entities of the plurality of entities.

In step 308, the hypergraph construction module 224c of the data processing system 200 adds directed edges to the hypergraph to form a partial order hypergraph. To jointly represent the partial-order relations and the higher-order relations among entities, we first construct a normal hypergraph, and then use directed edges to connect vertices that have any partial-order relation. Note that it is possible that there are multiple edges between two vertices, since multiple partial-order relations are considered. Concerning the efficiency of downstream graph-based learning applications, we constrain that directed edges only exist on vertices connected by at least one hyperedge. Such a constraint guarantees that the number of directed edges constructed from a partial-order relation is no larger than the number of nonzero entries in the hypergraph Laplacian matrix. As such, a learning algorithm that enumerates all directed edges will not increase the time complexity of calculating the hypergraph Laplacian term.

In step 310, the matrix representation module 224c of the data processing system 200 generates matrices representing the partial order hypergraph. After constructing a hypergraph, we use several matrices to represent it, such as the incidence matrix H and hypergraph Laplacian matrix L. In addition to these matrices, we further introduce a partial incidence matrix $H^r \in R^{N \times N}$ to represent the directed edges of a partial-order relation r.

Figure 4:
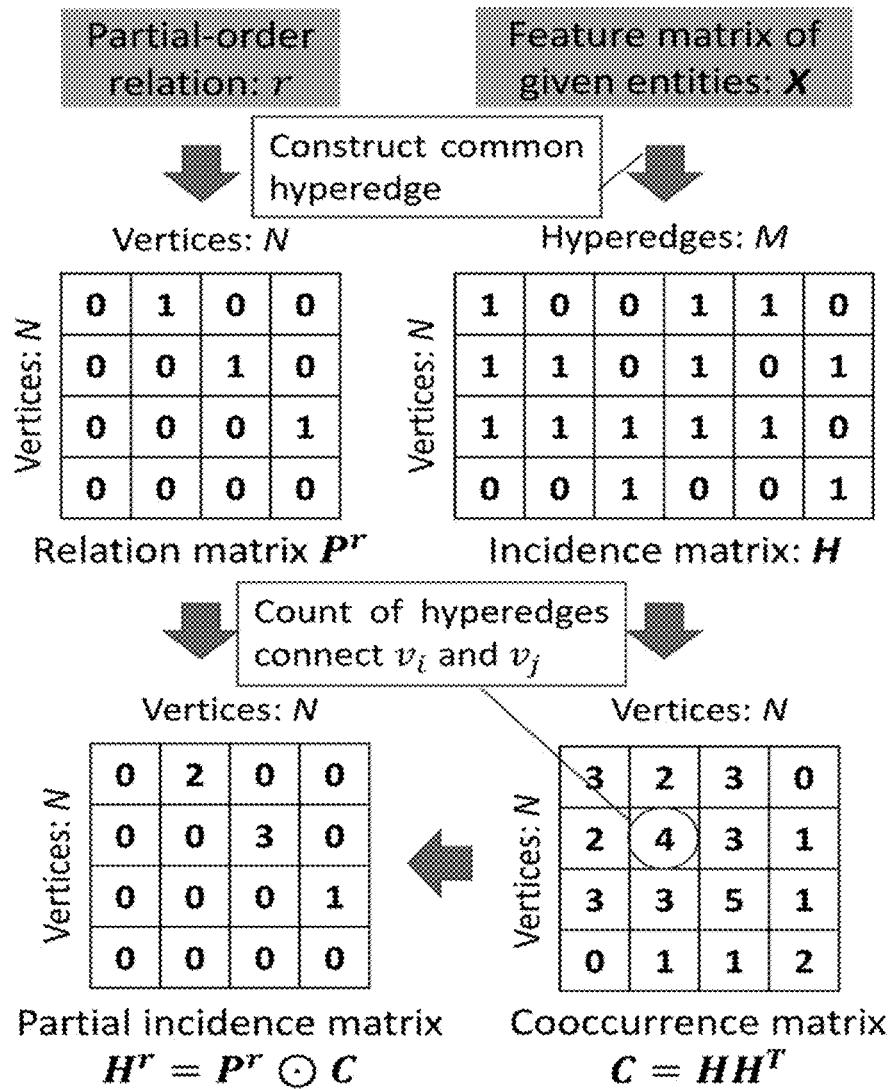
FIG. 4 shows an example of matrix representation of a partial order hypergraph used in an embodiment of the present invention.

FIG. 4 shows an example of matrix representation of a partial order hypergraph used in an embodiment of the present invention. As shown in FIG. 4, given the feature matrix X and a partial-order relation r, we construct the incidence matrix H of the hypergraph and the binary relation matrix $P^r$, respectively. We then generate the co-occurrence matrix C from H and apply element-wise product to C and $P^r$ to get the partial incidence matrix $H^r$.

The binary relation matrix is given by $P^r \in R^{N \times N}$, where $P_{ij}^r = 1$ if $p^r(x_i, x_j)$ is true. Based on the incidence matrix H of the hypergraph, we further build a co-occurrence matrix $C \in R^{N \times N}$, where each element $C_{ij}$ denotes the number of hyperedges connecting vertex i and j. Then the partial incidence matrix $H^r$ can be derived, $$H^r = P^r \odot C \quad (7)$$

where $\odot$ is the element-wise matrix multiplication. In the partial incidence matrix, a non-zero entry $H_{ij}^r$ means that the i-th and j-th vertices have the r-th partial-order relation, and they are simultaneously connected by $H_{ij}^r$ hyperedges. In other words, we assign higher weights to vertex pairs that are connected by more hyperedges, accounting for the effect that vertex pairs with higher co-occurrence are more important.

Returning now to FIG. 3, in step 310, the objective function module 224e of the data processing system 200 forms an objective function. After constructing a POH, we have several matrices to represent it, including the general ones describing a conventional hypergraph (e.g., the incidence matrix H and edge weight matrix W), and the specific partial incidence matrices $\{H^r | r=1, 2, \ldots, R\}$ to model partial-order relations. We now consider how to extend the conventional hypergraph learning methods for POHs.

The key problem is the encoding of the partial-order relations and the corresponding logical rules into the learning framework of Equation (2). Generally speaking, there are two solutions—either injecting the rules into the predictive model (i.e., the definition of f(x)), or using the rules to regularize the learning (i.e., augmenting the objective function Γ). The first solution may need different ways to encode the rules for different predictive models, such as logistic regression, factorization machines, and neural networks.

In this example, we opt for the second solution, aiming to provide a generic solution for POH learning. Specifically, we append an additional regularization term $\mathcal{P}$ that encodes partial-order rules to the objective function:

$$\Gamma = \mathcal{G} + \lambda \mathcal{L} + \beta \mathcal{P} \quad (8)$$

where β is a hyperparameter to balance $\mathcal{P}$ and the other two terms. Similar to the smoothness regularizer $\mathcal{G}$, $\mathcal{P}$ should also operate on the predicted label space to regularize the learning process. We define $\mathcal{P}$ as:

$$\mathcal{P}_0 = \sum_{r=1}^{R} a_r E_{(i,j) \sim H_{ij}^r \neq 0}[1 - q^r(\hat{y}_1, \hat{y}_J)] = \sum_{r=r}^{R} \frac{a_r}{|H^r|} \sum_{\{i,j | H_{ij}^r \neq 0\}} 1 - q^r(\hat{y}_1, \hat{y}_J) \quad (9)$$

where $\hat{y}_1 = f(x_i)$ is the prediction of $x_i$, $|H^r|$ denotes the number of nonzero entries in $H^r$, and $a_r$ is the hyperparameter to control the importance of the logical rule of the r-th partial-order relation. The core idea of this regularization term is to enforce the predictions of vertices that have a partial-order relation to be consistent with the corresponding rule. To be more specific, small values of $\mathcal{P}_0$ can be achieved if $r^r(\hat{y}_1, \hat{y}_1)$ is 1, meaning that $p^r(x_i, x_j)$ is true (evidenced by $H_{ij}^r \neq 0$) and the rule $p^r(x_i, x_j) \rightarrow q^r(f(x_i), f(x_j))$ is satisfied. However, this definition treats all vertex pairs of a partial-order relation equally, without considering their relative strengths. This assumption may decrease modeling fidelity for practical applications. To address this problem, we revise the regularizer as:

$$\mathcal{P}_1 = \sum_{r=1}^{R} \frac{a_r}{|H^r|} \sum_{\{i,j | H_{ij}^r \neq 0\}} (1 - q^r(\hat{y}_1, \hat{y}_J)) H_{ij}^r \quad (10)$$

which incorporates $H_{ij}^r$ as a coefficient to rescale the regularization strength of a vertex pair. With such a formulation, we enforce stronger partial-order regularization for vertex pairs that are connected by more hyperedges. Lastly, to get rid of the difficulties in discrete optimization, we replace the binary logic function $q^r$ with a continuous function $s^r$ that approximates it. Such approximation trick allows stable optimization. This leads to the final version of our proposed partial-order regularizer:

$$\mathcal{P} = \sum_{r=1}^{R} \frac{a_r}{|H^r|} \sum_{\{i,j | H_{ij}^r \neq 0\}} s^r(\hat{y}_1, \hat{y}_J) H_{ij}^r, \quad (11)$$

where $s^r$ is a self-defined function adjustable for different problems. For instance, $s^r$ might be the subtraction between the predicted ranks $\hat{y}_1 - \hat{y}_1$ in a ranking problem, while in a classification problem, $s^r$ could be the gap between the predicted probabilities on a specific class.

In step 314, the objective function module 224e of the data processing system 200 minimizes the objective function to obtain a prediction function. By minimizing the objective function of equation (8), we can achieve the prediction function that is smooth over the hypergraph and satisfies the logical rules on partial-order relations. Note that the regularization terms $\mathcal{L}$ and $\mathcal{P}$ operate on the predicted label space only and do not introduce extra model parameters. As such, the only model parameters to learn come from the predictive model f(x). Given that f is a differentiable function (e.g., logistic regression and neural networks), we can optimize the objective function with standard gradient-based methods, such as the stochastic (or batch) gradient descent. Moreover, one can also directly learn f(x) without specifying an explicit form of the predictive model. This will make the prediction function comply with the regularization to the maximum degree.

In step 316, the output module 224f of the data processing system 200 outputs the prediction function. The prediction function specifies a relationship between the entities.

In the following, we analyze the time complexity of POH learning by comparing with conventional hypergraphs. The computational complexity of conventional hypergraph learning methods is O(J), where J denotes the number of nonzero entries in the sparse hypergraph Laplacian matrix L. In contrast, the additional computational cost of our POH learning comes from the construction of the partial incidence matrices $\{H^r|r=1, 2, \ldots, R\}$ and the partial-order regularization term $\mathcal{P}$. To compute $H^r$, we need to obtain the co-occurrence matrix C first, and then evaluate the element-wise product $C \odot P^r$. For C, we can achieve it by traversing all nonzero entries on the incidence matrix H, for which the complexity is O(J). Then for each nonzero element $C_{ij}$ in C, we check whether $p^r(x_i, x_j)$ is true or not to obtain $C \odot P^r$. As such, the complexity of constructing a $H^r$ is O(J) and the overall complexity of constructing all R partial incidence matrices is O(RJ). Similarly, the computation of $\mathcal{P}$ can be done in O(RJ) time. In a real-world application, the number of partial-order relations R is typically a small number, since we need to account for the most prominent numerical or graded categorical features only. As such, the overall time complexity of our POH learning is essentially O(J), which is the same as that of conventional hypergraph learning.

Example Applications of Partial Order Hypergraphs

1. University Rankings

Following the previous work described in Fuli Feng, Liqiang Nie, Xiang Wang, Richang Hong, and Tat-Seng Chua. Computational social indicators: a case study of chinese university ranking. In *SIGIR*, pages 455-464, 2017, we formulated university ranking as an unsupervised ranking (i.e., re-ranking) problem. Given N universities with a feature matrix $X \in \mathbb{R}^{N \times M}$ and a historical ranking result $y \in \mathbb{R}^N$, the target is to learn a new ranking $f \in \mathbb{R}^N$. To solve the problem, we manually selected several partial-order relations and constructed a partial-order hypergraph (POH) to represent the given universities. Upon the constructed POH, we learned f by minimizing a ranking instantiation of the POH learning objective function. Specifically, we set the loss term in Equation (8) as $\mathcal{L} = |y-f|_F^2$, which encourages the learned ranking to be consistent and smooth with the historical one. Besides, we set the soft logic functions $\{\hat{s}\{r\}|r=1, 2, \ldots, R\}$ as $s^r(f_i, f_j) = f_i - f_j$, i.e., university i is encouraged to be ranked ahead of university j if the two universities have the selected partial-order relations. By specifying the above application-specific terms, we derived the objective function for the task, $$\Gamma = f^T L f + \lambda |f - y|_F^2 + \beta \sum_{r=1}^{R} \frac{a_r}{|H^r|} \sum_{\{i,j|H_{ij}^r \neq 0\}} ReLU((f_i - f_j)H_{ij}^r), \quad (12)$$

where we further used the rectifier function (ReLU) described in Richard H R Hahnloser, Rahul Sarpeshkar, Misha A Mahowald, Rodney J Douglas, and H Sebastian Seung. Digital selection and analogue amplification coexist in a cortex-inspired silicon circuit. *Nature*, 405(6789):947, 2000. on the partial-order regularization term, so as to guarantee the objective function to be non-negative for stable optimization.

To investigate the effectiveness of the proposed method, we employed the dataset of Chinese university ranking collected by Fuli Feng, Liqiang Nie, Xiang Wang, Richang Hong, and Tat-Seng Chua. Computational social indicators: a case study of chinese university ranking. In *SIGIR*, pages 455-464, 2017. This dataset contains 743 Chinese universities with data collected between Jan. 1, 2015 and May 1, 2016. For each university, Web data from five channels were collected, including official, mass media, academic, employment, and general user channels. The official channel contains the primary information of a university, such as student quality, official activities, and development plans. In the mass media channel, they collected news reports mentioning the given university from mass media. The academic and employment channels contain university's academic status and graduate students employment statistics, respectively. The general user channel contains public impressions, attitudes, and sentiment polarities of universities shared in social media posts. To describe the universities, we also employed the rich set of features extracted by the authors Fuli Feng, Liqiang Nie, Xiang Wang, Richang Hong, and Tat-Seng Chua. Computational social indicators: a case study of chinese university ranking. In *SIGIR*, pages 455-464, 2017. Among the 743 universities, we selected 438 top-tier ones in China since they have more academic and research activities. Towards the historical ranking result y, we merged the ranking results in 2015 from four well-known ranking systems of Chinese universities, namely, CUAA, WSL, WH, and iPIN. The ranking ground-truth is generated in the same way, but based on the rankings of the four systems in the year 2016. As such, the task can be understood as using the past year's ranking and this year's features to predict the ranking of universities in this year. We normalized the constructed historical ranking result and the ground-truth into range [0,1] by scaling them with 1/N.

In order to evaluate the effectiveness of the partial hypergraph method we performed 5-fold cross-validation, employing three metrics to evaluate the ranking performance: mean absolute error (MAE) described in Cort J Willmott and Kenji Matsuura. Advantages of the mean absolute error (mae) over the root mean square error (rmse) in assessing average model performance. *Climate research*, 30(1):79-82, 2005, Kendall's tau (Tau) described in RB Nelsen. Kendall tau metric. Encyclopaedia of Mathematics, 3:226-227, 2001, and Spearman's rank (Rho) described in Charles Spearman. The proof and measurement of association between two things. *The American journal of psychology*, 100:441-471, 1987. The three metrics have been widely used to evaluate pointwise, pairwise, and listwise ranking methods. Note that better performance is evidenced by smaller MAE, larger Tau and Rho scores. Moreover, we carried out the student's t-test and reported the p-values where necessary.

The following baselines were compared:

Simple Graph—described in Denny Zhou, Jason Weston, Arthur Gretton, Olivier Bousquet, and Bernhard Schölkopf. Ranking on data manifolds. In *NIPS*, pages 169-176, 2004: It first constructs a simple graph to represent the universities, where the edge weight between two vertices is evaluated using the RBF kernel. We set the radius parameter σ as the median of the Euclidean distances of all pairs. The method then calculates the Laplacian matrix L, learning f by minimizing the objective function $fL^Tf+\lambda|y-f|^2$. We experimented with different values of $\lambda$ and reported the best performance.

Hypergraph—described in Abdelghani Bellaachia and Mohammed Al-Dhelaan. Multi-document hyperedge-based ranking for text summarization. In *CIKM*, pages 1919-1922, 2014. It first calculates the similarities between universities, and then constructs the hypergraph using neighbor-based methods. Specifically, the i-th hyperedge connects the k universities that are most similar to university i. The learning of f is performed by minimizing Equation (2). We tuned the two hyperparameters k and $\lambda$.

GMR—described in Fuli Feng, Liqiang Nie, Xiang Wang, Richang Hong, and Tat-Seng Chua. Computational social indicators: a case study of chinese university ranking. In SIGIR, pages 455-464, 2017: This is a state-of-the-art method for the university ranking task. It builds a simple graph from the features of each channel, modeling the relations between channels to reach a consensus ranking on all simple graphs. We used the same hyperparameter settings as reported in the paper.

POH-Salary: This method considers the partial-order relation on the salary feature. We encoded the logical rule $salary_>(x_i,x_j) \to rank_<(x_i,x_j)$, meaning that $x_i$ tends to be ranked higher than $x_j$ if the salary feature of $x_i$ is higher than that of $x_j$.

POH-NCEE: This method considers the partial-order relation on the NCEE feature, which stands for a university's admission requirement on the score of National College Entrance Examination. The logical rule to be encoded is naturally $NCEE_>(x_i,x_j) \to rank_<(x_i,x_j)$, meaning universities with a higher NCEE score tend to have a better quality.

POH-All: In this method, we model both partial-order relations as encoded in POH-Salary and POH-NCEE. We set the importance hyperparameters for the regularizers of the two rules as $a_1$ and $1-a_1$, respectively.

We employed grid search to select the optimal hyperparameters for POH methods based on the results of Tau. For POH-Salary and POH-NCEE, we tuned one implicit (k) and two explicit hyperparameters ($\lambda$ and $\beta$). To validate the strength of the proposed POH over traditional hypergraph, we set k and $\lambda$ as the optimal ones of the baseline Hypergraph, and then searched $\beta$ in the range of [1e-4,1e1]. For POH-All, we tuned one more hyperparameter $a_1$, which controls the importance of logical rules and is in the range of [0,1].

Figure 5:
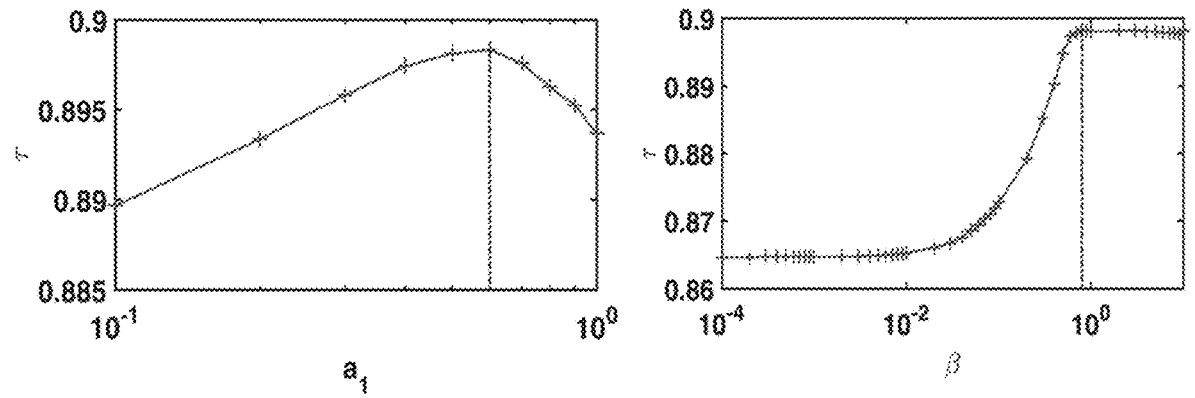
FIG. 5 is a graph showing the tuning of parameters in a method according to an embodiment of the present invention.

FIG. 5 shows the procedure of tuning $\alpha_1$ and $\beta$ for POH-All. The vertical dotted line marked the optimal settings. This was accomplished by varying one parameter and fixing the other to the optimal value. As can be seen, our method is rather insensitive to hyperparameters around their optimal settings.

Table 1 below shows a comparison of the performance of different methods on the university ranking task. * and ** denote that the corresponding performance is significantly better (p-value<0.05) than all baselines and all other methods, respectively.

TABLE 1

| Methods | MAE | Tau | Rho |
| --- | --- | --- | --- |
| Simple Graph | 0.074 ± 9e-3 | 0.870 ± 2e-2 | 0.970 ± 8e-3 |
| Hypergraph | 0.067 ± 7e-3 | 0.876 ± 9e-3 | 0.974 ± 5e-3 |
| GMR | 0.065 ± 7e-3 | 0.871 ± 3e-2 | 0.970 ± 1e-2 |
| POH-Salary | 0.054 ± 1e-2* | 0.892 ± 1e-2* | 0.979 ± 5e-3* |
| POH-NCEE | 0.055 ± 1e-2* | 0.893 ± 9e-3* | 0.978 ± 5e-3* |
| POH-All | 0.053 ± 1e-2* | 0.898 ± 1e-2** | 0.980 ± 6e-3** |

Note that we have intentionally fixed k and $\lambda$ to the optimal ones of Hypergraph, which also simplifies the tuning process. As described below with reference to FIG. 6, further tuning k and $\lambda$ based on the performance of POH methods can lead to even better performance.

As can be seen from Table 1, hypergraph performs better than Simple Graph, which verifies that considering the higher-order relations among universities is effective for the ranking task. All POH-based methods outperform baselines by a large margin (e.g., POH-All outperforms GMR with an improvement of 18.46%, 3.10%, and 1.03% w.r.t., MAE, Tau, and Rho, respectively). This demonstrates the effectiveness of our proposed POH and regularized learning in integrating partial-order relations.

POH-All outperforms both POH-Salary and POH-NCEE. It further verifies the advantage of POH-based learning methods and reflects that jointly modeling multiple partial-order relations and rules is helpful. The p-values of student's t-test between POH-based methods and all the other methods are smaller than 0.05, indicating the significance of the performance improvements.

As we constructed hypergraphs by connecting a vertex with its k-nearest vertices, larger k makes the POH-based methods consider more vertex pairs with the given partial-order relations (these pairs would be eliminated if the vertex pair is not connected by any hyperedge). It is thus interesting to see how does the setting of k impact the performance of POH learning.

Figure 6:
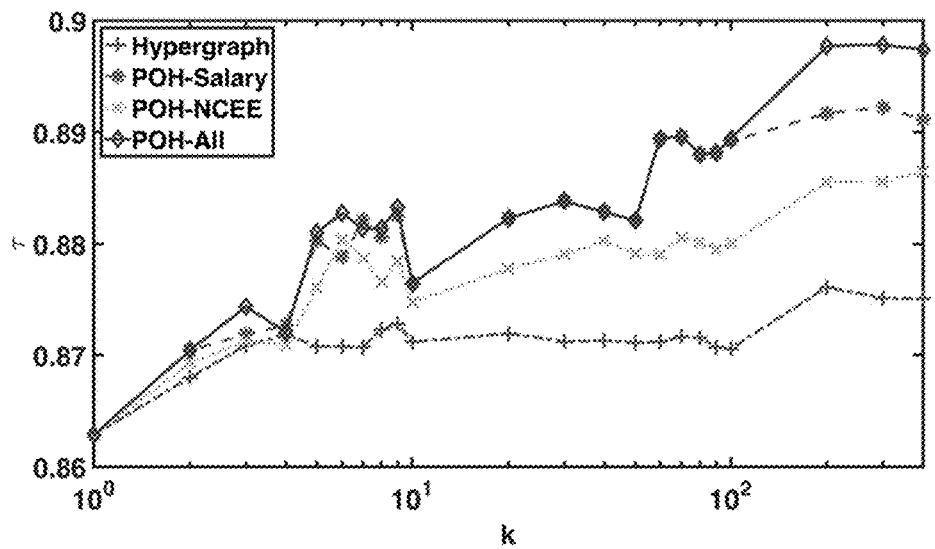
FIG. 6 is a graph showing a comparison of results obtained from hypergraph methods and partial order hypergraph methods according to embodiments of the present invention for a university ranking task.

FIG. 6 is a graph showing comparison on Tau of Hypergraph and POH-based methods w.r.t., different k. Note that other hyperparameters have been fairly tuned for each setting of k. As can be seen, all POH-based methods outperform the Hypergraph on all settings. It demonstrates that the proposed POH learning consistently outperforms the conventional hypergraph, regardless of the underlying hypergraph structure. Moreover, all POH-based methods achieve performances better than those reported in Table 1, which shows the performance of POH methods on the optimal k of Hypergraph only. It reveals the potential of POH-based methods on further improvements if a better hyperparameter tuning strategy is applied.

To understand the results better, we performed finer-grained error analysis. Given the result generated by a method, we generated an array of rank positions (integers from 1 to N) for universities, computing the absolute error on the rank position on each university.

Figure 7:
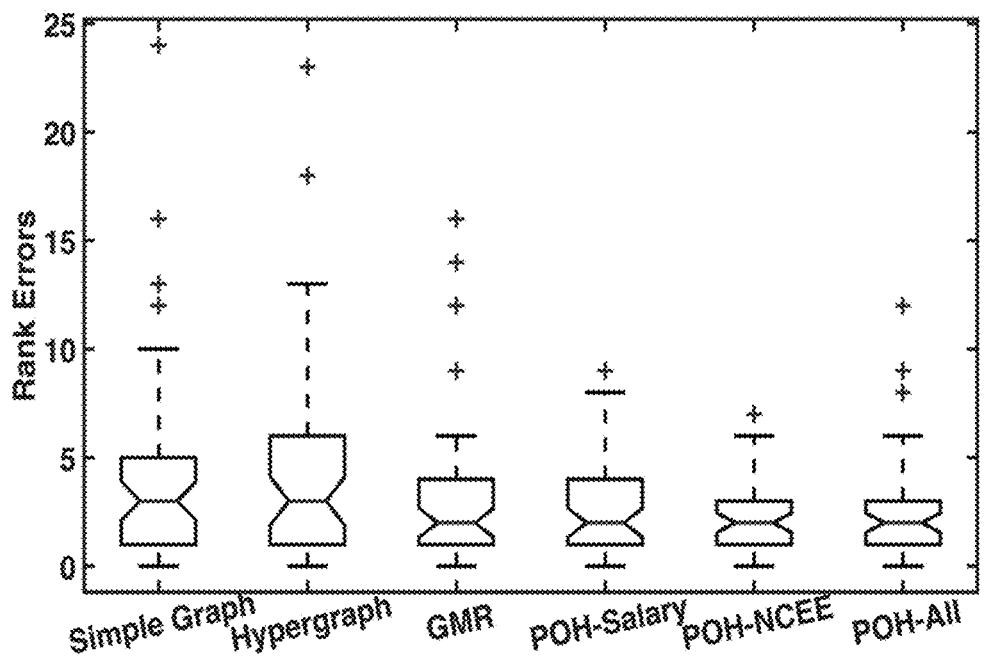
FIG. 7 is a boxplot graph showing ranking errors of graph methods and partial order hypergraph methods according to embodiments of the present invention for a university ranking task.

FIG. 7 is a boxplot showing the distribution of the absolute rank errors of a university ranking task for different methods. As can be seen, the rank error distribution of POH-based methods is denser and centralizes at smaller medians than that of Simple Graph and Hypergraph. It provides sufficient evidence on the better ranking generated by the POH-based methods. Moreover, we find that Simple Graph and Hypergraph make errors larger than 5 on about 25% of the universities, which is rarely seen from POH-based methods. Meanwhile, the largest error made by Simple Graph and Hypergraph is almost two times that of POH-based methods. These results demonstrate that POH-based methods are more robust, thus being more applicable in real-world applications. Among the baselines, GMR achieves the smallest rank error, which is comparable with POH-Salary. This signifies the usefulness of modelling the relations among data from different channels, which could be a future direction to be explored by POH-based methods.

Figure 8:
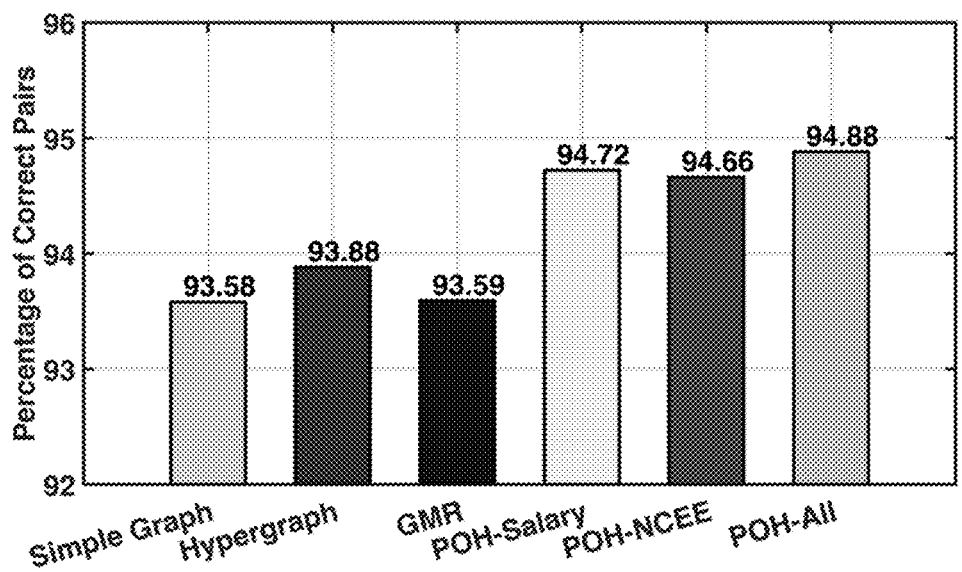
FIG. 8 is a bar graph showing percentage of correct pairs in a university ranking test for graph methods and partial order hypergraph methods according to embodiments of the present invention.

FIG. 8 is a graph showing the percentage of correctly ranked university pairs in the university ranking task for different methods. Besides the investigation on pointwise rank errors, we further performed an analysis on pairwise ranks. For each method, we counted the number of university pairs that are ranked correctly, and drew the percentage of correct pairs in FIG. 8. As shown, POH-based methods manage to generate ranks with correct order on 1% more university pairs than Simple Graph, Hypergraph, and GMR, further demonstrating the accuracy and advantage of POH-based methods. Considering that there are more than 80,000 university pairs, an improvement of 1% (correctly ranking 800+ pairs) is a significant improvement.

As described above, the proposed partial order hypergraphs provide significant performance benefits compared to existing methods.

2. Popularity Prediction

Predicting the popularity of online content is a hot research topic in social media mining and has varying problem statements. Following the recent work on micro-video popularity prediction set out in Jingyuan Chen, Xuemeng Song, Liqiang Nie, Xiang Wang, Hanwang Zhang, and Tat-Seng Chua. Micro tells macro: predicting the popularity of micro-videos via a transductive model. In *MM*, pages 898-907, 2016, we formulated the task as a semi-supervised regression problem. Given N+U items with a feature matrix $X \in R^{(N+U) \times M}$ and the ground-truth popularity of the N items $y \in R^N$, the objective is to learn a function $\hat{y}=f(x_i)$) that maps an item from the feature space to the popularity space. To solve the problem, we first constructed a POH with partial-order relations on some important numerical features (detailed later in experiments). We then derived an instantiation of the general framework Equation (8) for the semi-supervised regression task as follows:

$$\Gamma = \hat{y}^T L \hat{y} + \lambda \sum_{i=1}^{N}(\hat{y}_1 - y_i)^2 + \beta \sum_{r=1}^{R} \frac{a_r}{|H^r|} \sum_{\{i,j|H_{ij}^r \neq 0\}} ReLU((\hat{y}_j - \hat{y}_1)H_{ij}^r), \quad (13)$$

Where $\hat{y}=[\widehat{y_1}, \ldots, \widehat{y_N}, \widehat{y_{N+1}}, \ldots, \widehat{y_{N+U}}] \in R^{N+U}$, denoting the prediction of all items (both with labels and without labels).

We employed the same dataset as Jingyuan Chen, Xuemeng Song, Liqiang Nie, Xiang Wang, Hanwang Zhang, and Tat-Seng Chua. Micro tells macro: predicting the popularity of micro-videos via a transductive model. In *MM*, pages 898-907, 2016 for experiments. It contains 9,719 micro-videos collected from Vine (https://vine.co/) posted between Jul. 1 and Oct. 1, 2015. Each micro-video has visual, audio, and textual contents, as well as the profile of the user who posted it. With these data, the authors extracted a rich set of popularity-oriented features, such as user activities, object distribution, aesthetic description, sentence embedding, and textual sentiment polarity, to represent a micro-video. To measure the popularity of a micro-video, they employed four popularity-related indicators, namely, the number of comments (n_comments), the number of likes (n_likes), the number of reposts (n_reposts), and the number of loops (n_loops); the four indicators were averagely fused ((n_comments+n_likes+n_reposts+n_loops)/4) as the popularity ground-truth for a micro-video.

We performed 10-fold cross-validation and evaluated the performance in terms of three metrics. From the regression perspective, we followed the previous work Jingyuan Chen, Xuemeng Song, Liqiang Nie, Xiang Wang, Hanwang Zhang, and Tat-Seng Chua. Micro tells macro: predicting the popularity of micro-videos via a transductive model. In MM, pages 898-907, 2016, and employed normalized mean square error (nMSE). Meanwhile, we utilized two ranking-oriented metrics, Tau and Rho correlation coefficients. Besides, we carried out the student's t-test and reported the p-values where necessary.

We compare with following baselines:

Simple Graph Denny Zhou, Jason Weston, Arthur Gretton, Olivier Bousquet, and Bernhard Schölkopf. Ranking on data manifolds. In *NIPS*, pages 169-176, 2004. We applied the same settings as the Simple Graph described in the university ranking task.

Hypergraph: Abdelghani Bellaachia and Mohammed Al-Dhelaan. Multi-document hyperedge-based ranking for text summarization. In *CIKM*, pages 1919-1922, 2014. We also adopted the same setting as the Hypergraph described in the university ranking task.

TMALL: Jingyuan Chen, Xuemeng Song, Liqiang Nie, Xiang Wang, Hanwang Zhang, and Tat-Seng Chua. Micro tells macro: predicting the popularity of micro-videos via a transductive model. In *MM*, pages 898-907, 2016. This method first calculates a simple graph Laplacian matrix with features from each modality (visual, audio, etc.). It then learns a common space Laplacian matrix by considering the relations among different modalities and fusing the corresponding graph Laplacian matrices. It finally performs a simple graph learning like Simple Graph on the common Laplacian matrix. We followed the settings as reported in the paper.

GCN: Thomas N Kipf and Max Welling. Semi-supervised classification with graph convolutional networks. ICLR, 2017. This is the state-of-the-art graph learning method by using graph convolutional neural networks. We replaced the log loss term in their implementation with the same mean squared loss in Equation (13) for a fair comparison. We carefully tuned four hyperparameters, namely, learning rate, dropout ratio, $I_2$-norm weight and hidden layer size.

LR-HG: This method is similar to Hypergraph. Instead of directly learning ŷ, we parameterized it as a linear regression (LR) model on features. The optimization process learns the parameters of LR, which is then used to predict ŷ.

We evaluated several POH methods on the same hypergraph structure of Hypergraph:

POH-Follow: This method considers a partial-order relation on the follower feature (i.e., the number of followers of the user who posted the video). It encodes the logical rule followers$_>(x_i,x_j) \rightarrow$popularity$_>(x_i,x_j)$, meaning that $x_j$ would be more popular than $x_i$ if the user of $x_i$ has more followers than that of $x_j$.

POH-Loop: This method has the same setting as POH-Follow, besides that it encodes another partial-order relation on the loop feature (i.e., total number of views of all videos posted by a user).

POH-All: This method jointly encodes the two partial-order relations in POH-Follow and POH-Loop. We set the corresponding rule importance hyperparameters as $\alpha_1$ and $1-\alpha_1$, respectively.

LR-POH: Similar to LR-HG, this method parameterizes the ŷ of POH-All as a linear regression model on input features.

We employed the same procedure as described above for the university ranking task to tune the hyperparameters of POH methods. We investigated the sensitivity of our proposed POH-based methods by taking POH-All as an example.

Figure 9:
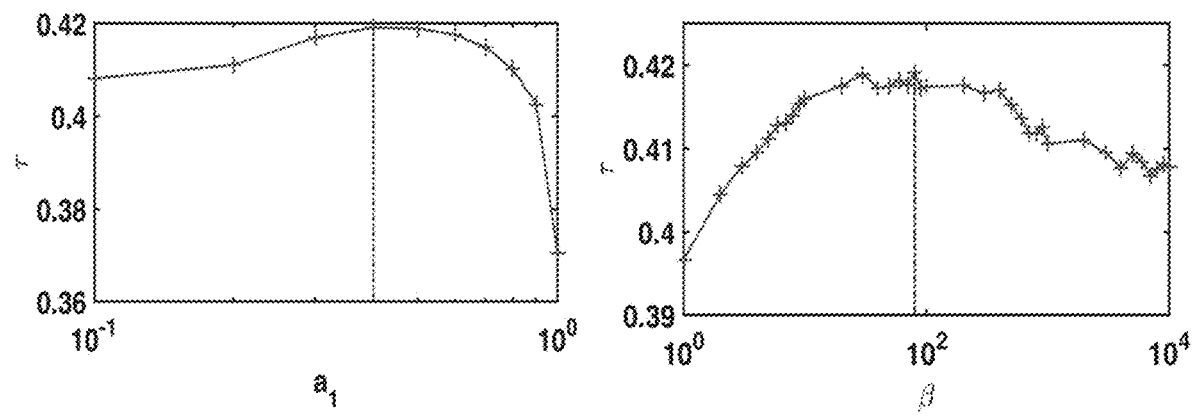
FIG. 9 is a graph showing the tuning of parameters in a method according to an embodiment of the present invention.

FIG. 9 shows the procedure for tuning procedure of tuning $\alpha_1$ and $\beta$ for POH-All. The vertical dotted line marks the optimal settings. FIG. 9 illustrates the performance of POH-All while varying one hyperparameter and fixing the others with optimal values. Again, the results demonstrate that our model is not sensitive to the parameters around their optimal settings.

We first investigated the effectiveness of the proposed methods. Table 2 below shows the performance of all the compared methods. * and ** denote that the corresponding performance is significantly better (p-value<0.05) than all baselines and all other methods, respectively.

TABLE 2

| Methods | nMSE | Tau | Rho |
| --- | --- | --- | --- |
| Simple Graph | 0.999 ± 1e−3 | 0.137 ± 2e−2 | 0.200 ± 2e−2 |
| Hypergraph | 1.000 ± 4e−5 | 0.165 ± 3e−2 | 0.240 ± 4e−2 |
| TMALL[7] | 0.979 ± 9e−3 | — | — |
| POH-Follow | 1.000 ± 4e−4 | 0.393 ± 3e−2* | 0.562 ± 3e−2* |
| POH-Loop | 0.997 ± 2e−3 | 0.376 ± 2e−2* | 0.540 ± 3e−2* |
| POH-All | 0.989 ± 9e−3 | 0.419 ± 2e−2** | 0.592 ± 3e−2** |
| GCN | 0.919 ± 6e−2 | 0.171 ± 2e−2 | 0.252 ± 3e−2 |
| LR-HG | 0.846 ± 1e−1* | 0.117 ± 2e−2 | 0.182 ± 3e−2 |
| LR-POH | 0.724 ± 2e−1** | 0.350 ± 2e−2* | 0.496 ± 3e−2* |

As can be seen from Table 2, Hypergraph outperforms Simple Graph w.r.t., Tau and Rho, although they achieve the same performance level on nMSE. It verifies that considering the higher-order relations among videos leads to popularity prediction with more accurate relative orders.

POH-Follow and POH-Loop further surpass Hypergraph with an average improvement of 133.03% and 129.58% on the pairwise and listwise ranking metrics; meanwhile, slight improvement is obtained on the pointwise regression metric nMSE. This indicates that considering meaningful partial-order relations is particularly helpful for better predicting the relative order of the videos.

POH-All outperforms POH-Follow and POH-Loop with a significant average improvement on Tau (+8.97%) and Rho (+7.44%) as well as a slight improvement on nMSE. It validates that jointly considering multiple partial-order relations is useful.

Comparing Hypergraph with LR-HG, we can see that better nMSE can be achieved by using LR as the predictive model, but the two ranking metrics become worse. The same situation can be observed for POH-All and LR-POH. This provides evidence that using a sophisticated model can better fit the labels and help to minimize the regression loss, however, the ranking performance may not be necessarily improved. The same finding has been observed before in popularity prediction and another orthogonal application of item recommendation. In our case of graph-based learning, the regularizers (for smoothness and partial-order rules) carry strong signals for learning the relative orders between vertices. However, the regularization effects might be weakened when a specialized model is used to fit the label in the meantime.

GCN outperforms POH-All w.r.t., nMSE, while Tau and Rho indicate that its ranking performance is worse. The lower nMSE of GCN can be credit to the strong representation power of the underlying neural network, which can fit the labels well. However, GCN may overfit the data and fail to predict the popularity ranking well without regularization on the relative orders of vertices.

LR-POH achieves the best performance with significantly better nMSE than all the other compared methods as well as tremendously better Tau and Rho than all the baseline methods. This further demonstrates the effectiveness of our proposed POH learning.

We further studied whether the performance improvements of the proposed POH-based methods are consistent under different hypergraph settings. We compared the optimal performance of Hypergraph, POH-Follow, POH-Loop, and POH-All under different values of k, which controls the number of videos connected by a hyperedge.

Figure 10:
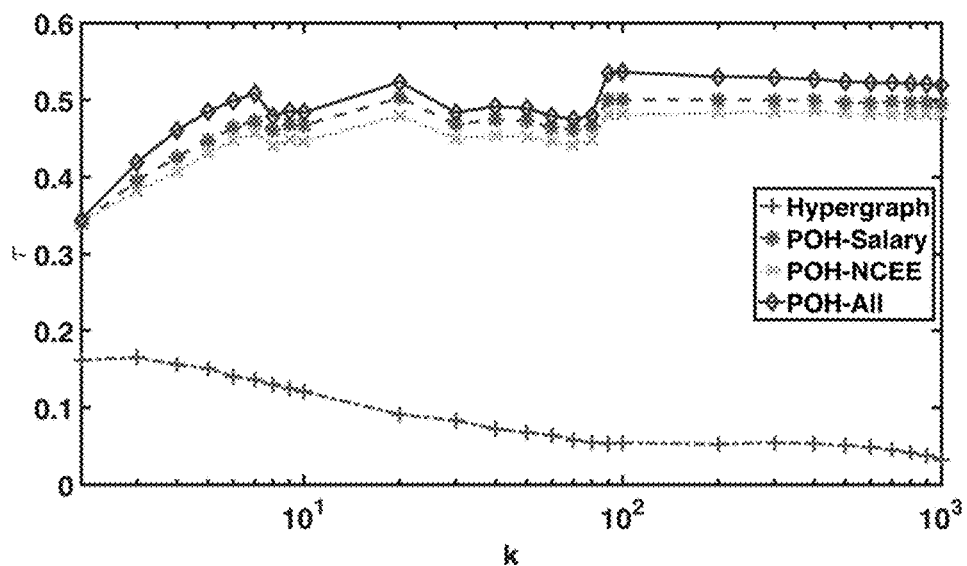
FIG. 10 is a graph showing a comparison of results obtained from a hypergraph method and partial order hypergraph methods according to embodiments of the present invention for a popularity prediction task.

FIG. 10 is a graph showing a comparison on Tau of Hypergraph and POH-based methods w.r.t., different k. As illustrated in FIG. 10, all POH-based methods outperform the Hypergraph under all the values of k by a large margin. It is worth noting that the optimal performance of POH methods are better than that shown in Table 2 (Table 2 shows the results of POH on the optimal setting of Hypergraph). This is consistent with the university ranking task, which implies the potential of further improving POH learning with a better hyperparameter tuning strategy.

As described above, embodiments of the present invention provide a partial-order hypergraph that improves conventional hypergraphs by encoding the partial-order relations among vertices. Graph-based learning methods may be applied to partial-order hypergraphs by integrating the second-order logic rules that encode the partial-order relations; moreover, the time complexity of learning remains unchanged.

Experimental results on university ranking and video popularity prediction demonstrate the effectiveness of our proposed methods.

It is envisaged that the proposed POH may be applied to more graph-based applications. Further POH learning may be improved by replacing the linear prediction function from feature to label spaces with advanced deep neural networks.

Whilst the foregoing description has described exemplary embodiments, it will be understood by those skilled in the art that many variations of the embodiments can be made within the scope and spirit of the present invention.

The invention claimed is:
1. A machine learning method comprising:
receiving input data comprising a set of feature variables each indicating features of a plurality of entities;
encoding partial order relations between entities of the plurality of entities as a set of logic rules;

constructing a hypergraph comprising a plurality of vertices representing the entities of the plurality of entities and a plurality of hyperlinks linking similar entities of the plurality of entities;

adding directed edges to the hypergraph to represent partial order interactions between entities to form a partial order hypergraph;

representing the partial order hypergraph as a set of matrices;

forming an objective function by replacing a binary logic function derived from the set of logic rules with a continuous function and using matrices of the set of matrices;

minimizing the objective function to obtain a prediction function; and outputting an indication of the prediction function.

2. A method according to claim 1, wherein the set of matrices comprises a partial incidence matrix representing the directed edges.

3. A method according to claim 2 wherein the partial incidence matrix is derived from a product of a binary relation matrix indicating pairs of entities having partial order relations and a co-occurrence matrix indicating a number of hyperedges connecting pairs of entities.

4. A method according to claim 1, wherein directed edges are only added between pairs of vertices connected by at least one hyperedge.

5. A method according to claim 1, wherein representing the partial order hypergraph as a set of matrices comprises assigning weights to pairs of vertices, the weights being dependent on the number of hyperedges connecting a pair of vertices.

6. A method according to claim 1, wherein the objective function comprises a regularization term that encodes the logic rules.

7. A method according to claim 1, wherein minimizing the objective function comprises applying a gradient based method to the objective function.

8. A ranking method comprising the method according to claim 1.

9. A prediction method comprising the method according to claim 1.

10. A non-transitory computer readable medium carrying processor executable instructions which when executed on a processor cause the processor to carry out a method according to claim 1.

11. A data processing system comprising a processor and a data storage device, the data storage device storing computer executable instructions operable by the processor to:

receive input data comprising a set of feature variables each indicating features of a plurality of entities;

encode partial order relations between entities of the plurality of entities as a set of logic rules;

construct a hypergraph comprising a plurality of vertices representing the entities of the plurality of entities and a plurality of hyperlinks linking similar entities of the plurality of entities;

add directed edges to the hypergraph to represent partial order interactions between entities to form a partial order hypergraph;

represent the partial order hypergraph as a set of matrices;

form an objective function by replacing a binary logic function derived from the set of logic rules with a continuous function and using matrices of the set of matrices;

minimize the objective function to obtain a prediction function; and output an indication of the prediction function.

12. A data processing system according to claim 11, wherein the set of matrices comprises a partial incidence matrix representing the directed edges.

13. A data processing system according to claim 12 wherein the partial incidence matrix is derived from a product of a binary relation matrix indicating pairs of entities having partial order relations and a co-occurrence matrix indicating a number of hyperedges connecting pairs of entities.

14. A data processing system according to claim 11, wherein directed edges are only added between pairs of vertices connected by at least one hyperedge.

15. A data processing system according to claim 11, wherein representing the partial order hypergraph as a set of matrices comprises assigning weights to pairs of vertices, the weights being dependent on the number of hyperedges connecting a pair of vertices.

16. A data processing system according to claim 11, wherein the objective function comprises a regularization term that encodes the logic rules.

17. A data processing system according to claim 11, wherein the data storage device stores computer executable instructions operable by the processor to minimize the objective function by applying a gradient based method to the objective function.

18. A data processing system according to claim 11, wherein the prediction function indicates a ranking of the entities.

* * * * *